May 20, 1930.    H. NAGIN    1,759,271
GRATING STRUCTURE
Filed June 27, 1927    2 Sheets-Sheet 1
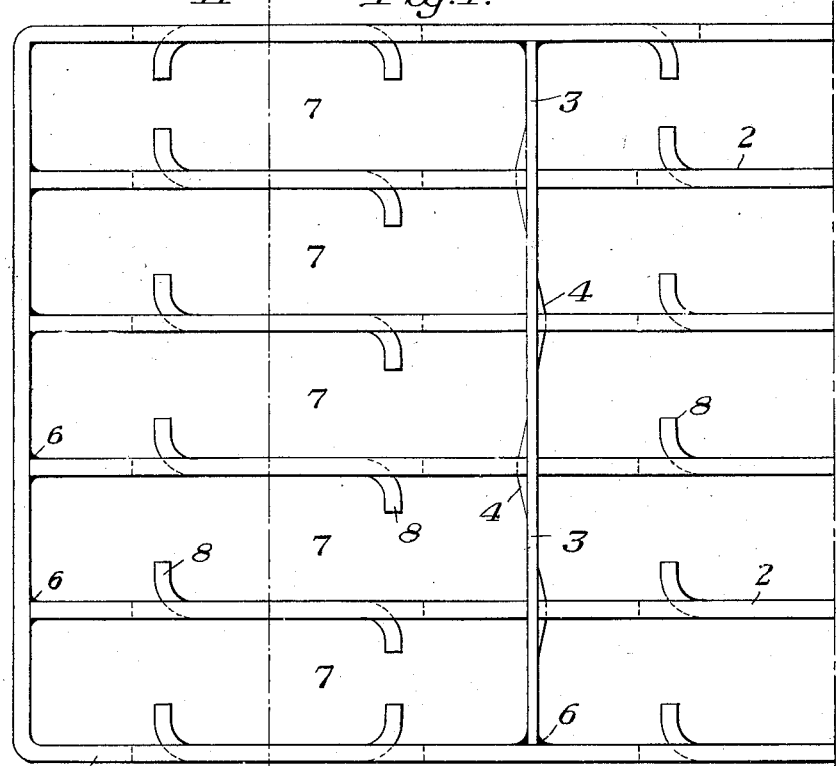
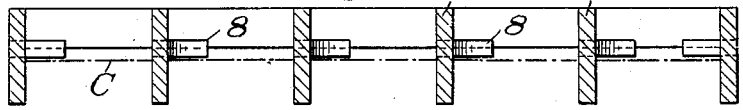
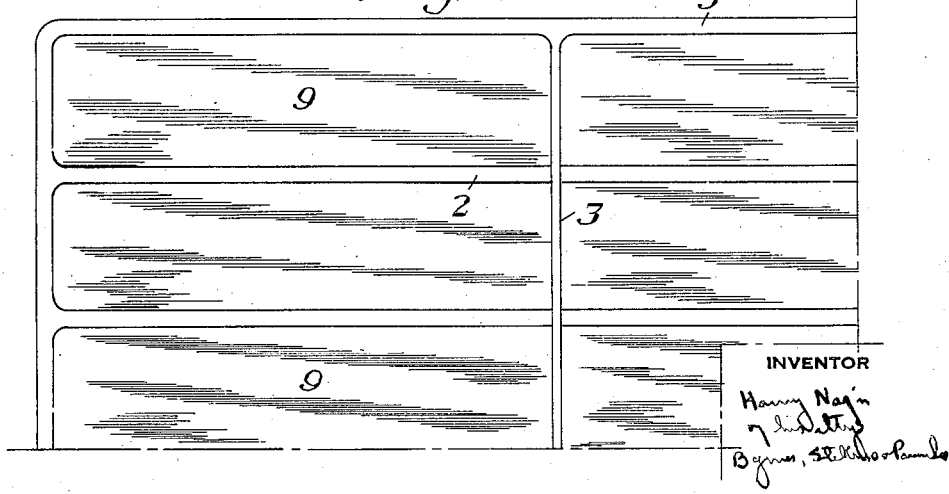
INVENTOR May 20, 1930.  H. NAGIN  1,759,271
GRATING STRUCTURE
Filed June 27, 1927  2 Sheets-Sheet 2

INVENTOR
Harry Nagin
by his atty
Byrnes, Stebbins & Parmelee

Patented May 20, 1930

1,759,271

UNITED STATES PATENT OFFICE

HARRY NAGIN, OF PITTSBURGH, PENNSYLVANIA, ASSIGNOR TO TRI-LOK COMPANY, OF PITTSBURGH, PENNSYLVANIA, A CORPORATION OF PENNSYLVANIA

GRATING STRUCTURE

Application filed June 27, 1927. Serial No. 201,702.

This invention relates to grating structures, and particularly to a self-sustaining frame work of spaced apart members having a filler material in the spaces between the members.

Gratings generally comprise girder bars held in spaced relation by cross bars. A grating is essentially of an open character and is, therefore, limited in its applications. On the other hand it provides a sturdy, self-sustaining structure which may be fabricated and shipped entire to the point of use.

I secure all of the advantages of a grating structure and eliminate the disadvantages which have limited its field of usefulness by providing a filler material which closes off the spaces between the members forming the grating structure. This filler material is preferably of such character that it may be molded in place, as for example, a rubber compound, bakelite or the like. The filler material need not be of the entire depth of the grating, and may have its upper surface formed so as to provide an anti-slip tread. The grating members are preferably so shaped as to assist in holding the filler material in place. For instance, tongues may be struck up from the grating bars, or projecting heads may be formed in the sides thereof. Other types of reinforcement may be employed.

The filler material may be of a contrasting color to the grating structure, thus giving an appearance which is particularly desirable in many applications.

My improved grating structure may be employed for use in floors, walk-ways, stairs, thresholds, elevator sills, automobile or truck running boards or other floor structures. It may also be employed for making partition walls or the like. For these latter applications, the filler material is preferably of such a character that it will receive nails, screws or other holding members.

In the accompanying drawings which illustrate the present preferred embodiment of the invention and certain modifications thereof, Figure 1 is a top plan view of a grating as constructed for an automobile running board, but before the filler material has been put in place, Figure 2 is a section taken on the line II—II of Figure 1, Figure 3 is a top plan view of a portion of the completed grating structure, Figure 4 is a transverse section through a grating showing the filler material in place, Figure 5 is a similar view showing a modified form of grating, Figure 6 is a perspective view showing one manner of providing additional support for the filler material, Figure 7 is a top plan view showing the use of reinforcing wires, and Figures 8 and 9 are views corresponding to Figure 6 but showing still further modified structures.

Figures 1 to 3 inclusive show a form of grating comprising girder bars 2 connected by cross bars 3. The girder bars 2 have slots formed therein, these slots having curved bottom portions. Cross bars are forced into the curved slots so as to permanently deform the cross bars and form locking tongues 4. This structure is substantially as described and claimed in my prior Patent No. 1,631,691, dated June 7th, 1927.

The grating shown in Figure 1 is designed for use as an automobile running board and is, therefore, provided with an edge member 5 extending entirely around the grating, and connected to the cross bars and girder bars by welding, as indicated at 6.

The grating comprises spaced apart bars defining open cells or spaces 7. Tongues 8 are struck up from the longitudinal bars of the grating, these tongues being formed in the general neighborhood of the neutral axis of the finished grating. Since the filler material possesses some strength in compression, the neutral axis of the finished grating is somewhat above the neutral axis of the longitudinal bars.

The cells 7 are each filled with a plastic material 9 preferably molded in place under heavy pressure. The material extends from the top of the grating down to a level indicated by a chain line C in Figure 2. The mere adherence of the material to the sides of the grating members is sufficient to hold the filler material in place under ordinary conditions, but the tongues 8 are helpful in providing a positive backing for the material. The welds 6 at the corners are somewhat rough, and these also insure a locking engagement. In addition to this, the locking tongues 4 of the cross bars provide a positive backing.

The locking tongues 4 and the tongues 8 are completely embedded in the filler material, although in some cases it may be desired to terminate the filler material either at the bottoms of the cross bars 3 or at the bottoms of the tongues 8.

Figure 4:
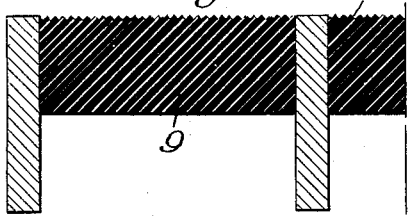
Figure 4 shows the filler material 9 with a corrugated top surface 10 which provides an anti-slip structure.
Figure 5:
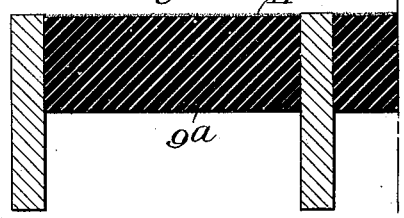
Figure 5 shows a separate anti-slip material such as silicon carbide crystals 11 lying over the top of the filler material 9ª. The silicon carbide crystals may be readily secured in place by spreading them over the surface of the mold and then placing the plastic material in position and applying the compacting pressure.
Figure 6:
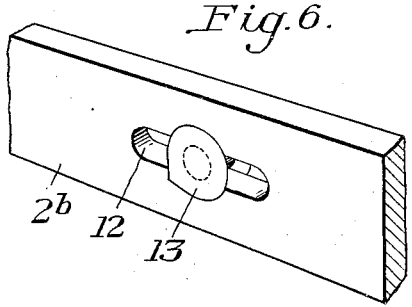

Figure 6 shows a girder bar 2ᵇ having a slot 12 formed therein. A rivet 13 with a projecting head on either side extends through the slot 12. The rivet heads function in much the same manner as the tongues 8. The filler material squeezes into the open portions of the slot 12 and thus further assists in permanently securing the material in place. The open spaces which are left by striking up the tongues 8 function in the same manner as the slots 12.

Figure 7:
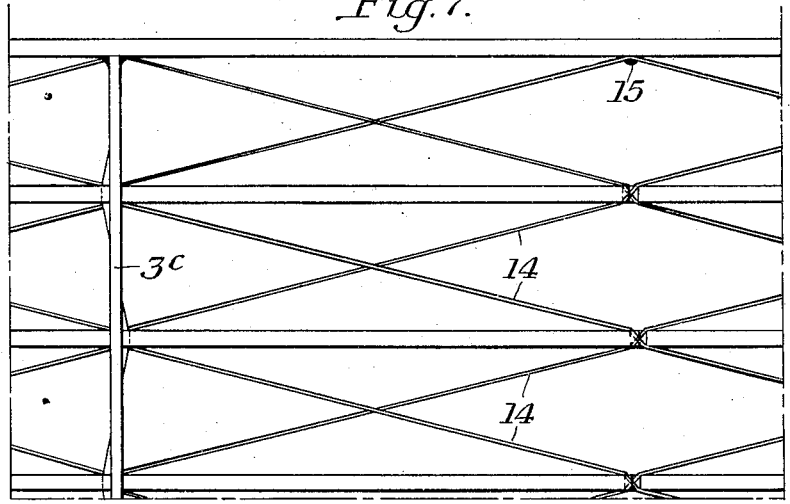

Figure 7 shows a modified structure wherein wires 14 are laced through the slots which hold the cross bars 3ᶜ in place. As shown at the right hand side of Figure 7, the wires are put in place in the slots before the cross bars 3ᶜ are inserted. When the cross bars are forced in place, the wires are pushed to the bottom of the slots and are firmly clamped therein. At the edges of the grating the wires are held in place by welding, as indicated at 15. The filler material is made of such depth that the wires are completely embedded.

Figure 8:
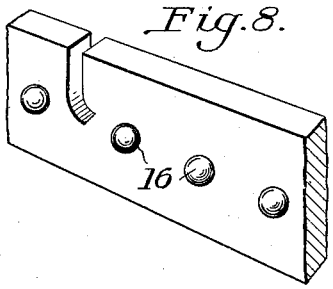

Figure 8 shows projecting beads or heads 16 for providing positive backing for the filler material. These beads are made by touching the sides of the cross bar with an electric welding stick.

Figure 9:
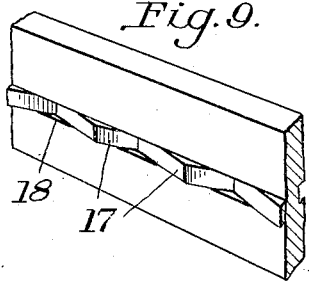

Figure 9 shows a deformed bar having alternate ridges 17 and recesses 18 which form a lock for filler material.

In all forms of the invention, the filler material cooperates with the grating structure to form a substantially continuous surface. The grating structure may be made up as units and shipped to the place where they are used. They are particularly useful for floor structures, but have other applications. They form very desirable running boards for automobiles, as they eliminate a large percentage of the squeaks and rattles occasioned by ordinary running board construction. Furthermore, they provide an exceedingly strong side bumper for the vehicles.

I have illustrated and described the present preferred form of my invention, but it will be understood that it is not thus limited, as it may be otherwise embodied within the scope of the following claims.

I claim:—

1. A grating structure formed of girder bars and cross bars, the cross bars lying in planes generally perpendicular to the top of the grating but having laterally offset portions, and a filler material in the spaces between the members, the offset portions forming backings for the filler material.

2. A grating structure formed of girder bars having crooked slots therein and cross bars forced into the slots, the portions of the cross bars lying in the slots being permanently deformed so as to secure the cross bars and the girder bars together, and a filler material in the spaces between the bars, the filler material being engaged by the deformed portions of the cross bars.

In testimony whereof I have hereunto set my hand.

HARRY NAGIN.